April 5, 1966     W. L. TAYLOR     3,244,190
PNEUMATIC RELAY VALVE
Filed Oct. 14, 1963     2 Sheets-Sheet 1
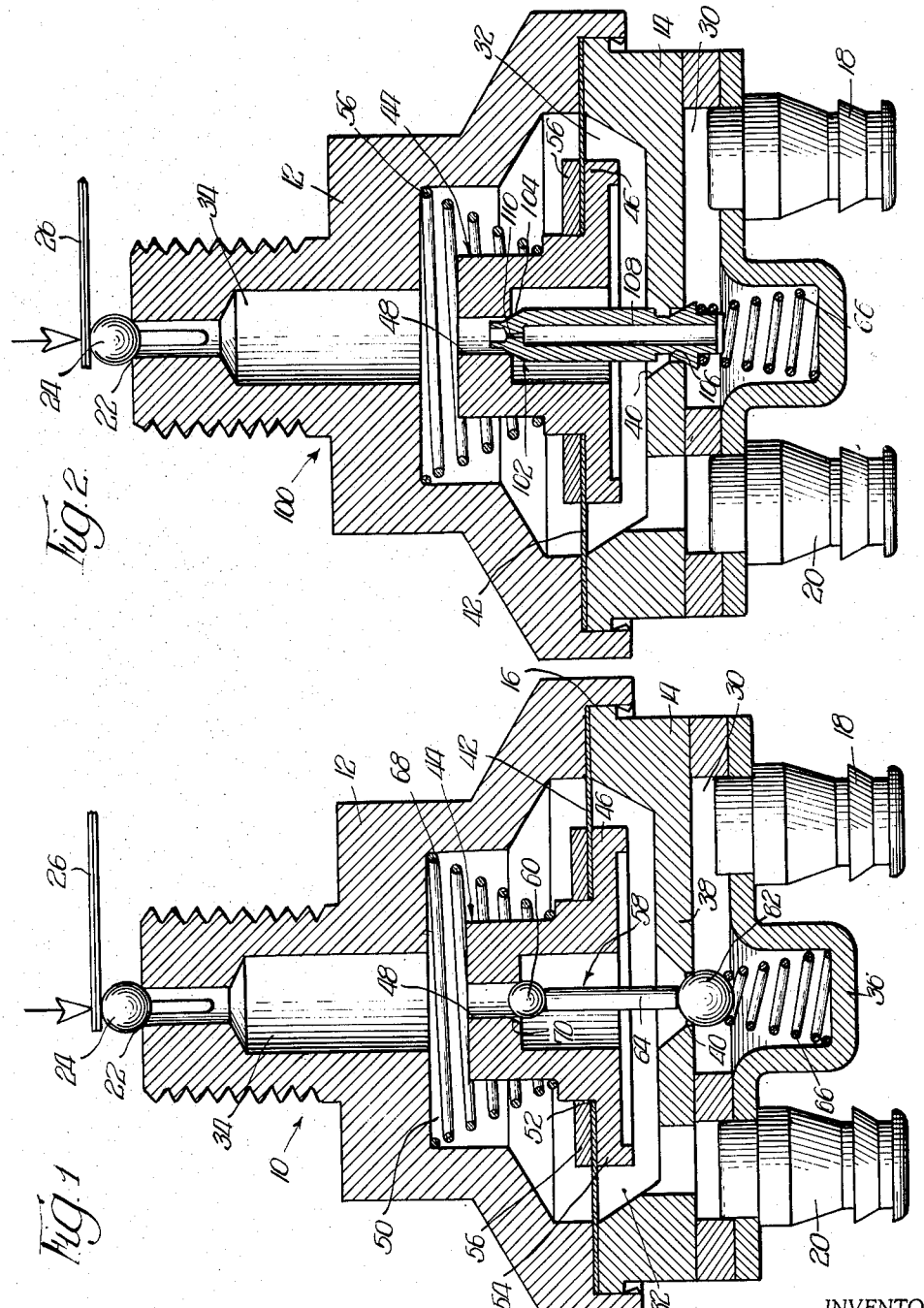
INVENTOR.
Wesley L. Taylor,
BY
Byron, Hume, Groen + Clement
ATTYS.

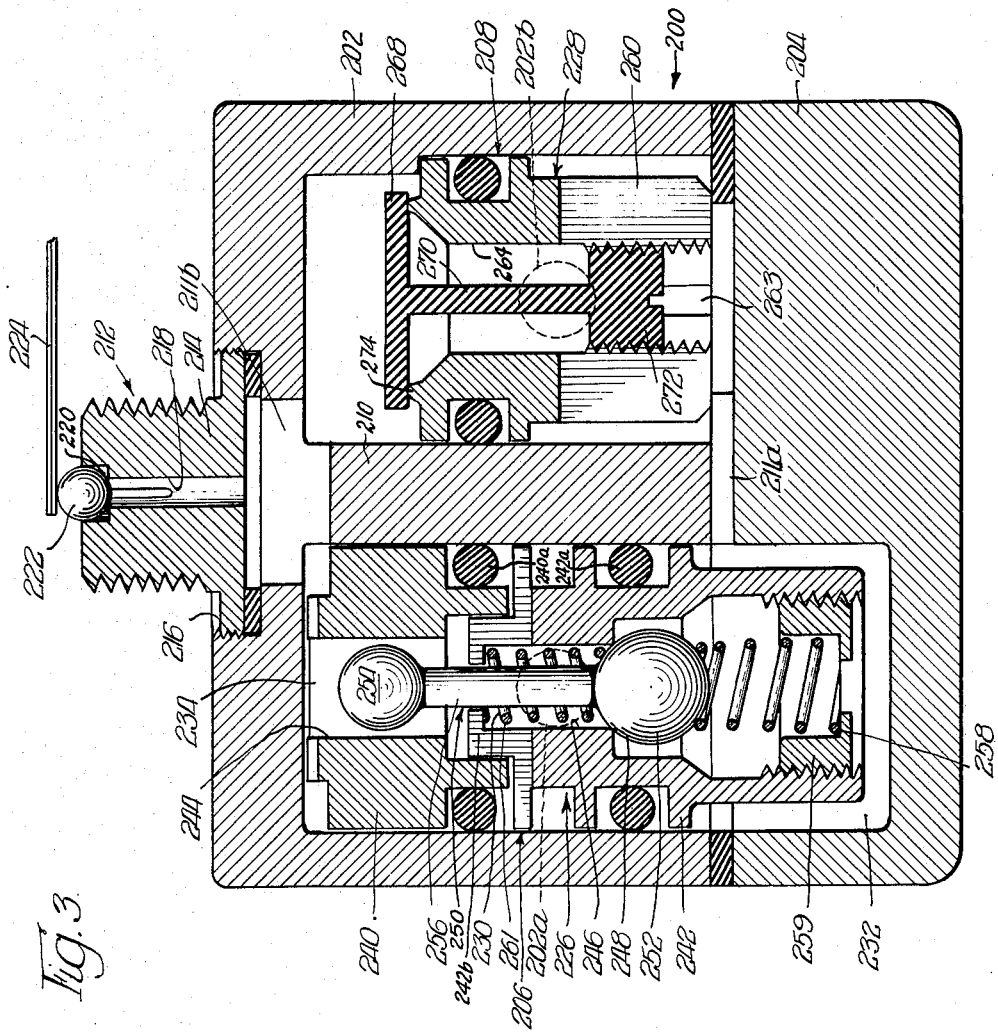

United States Patent Office 3,244,190
Patented Apr. 5, 1966

3,244,190
PNEUMATIC RELAY VALVE
Wesley L. Taylor, Glenview, Ill., assignor to The Powers Regulator Company, Skokie, Ill., a corporation of Illinois
Filed Oct. 14, 1963, Ser. No. 315,749
12 Claims. (Cl. 137—85)

This invention pertains to a valve and in particular to a relay valve especially suited for use in controlling a variable such as temperature. More specifically the valve is of the type used in pneumatic systems in which an input force, which is proportional to the controlled variable, is translated into a pneumatic force which, in turn, is transmitted to a control instrumentality.

One type of relay which has enjoyed long and extensive use is the flapper nozzle arrangement. The flapper nozzle consists of a bleed nozzle connected to a source of pressure through a restriction. A flapper is located in close proximity to the nozzle so as to control the exhaust therefrom to atmosphere. As the exhaust rate is varied relative to the flow through the restrictor the pressure within the system is varied. By positioning the flapper relative to the nozzle proportionately to the variable to be controlled, the pressure within the system may likewise be varied. The flapper nozzle arrangement has several distinct advantages over other types of relays including its simplicity and the ability to be actuated by sensing devices which generate signals of a relatively low force level. Particularly the flapper nozzle may be used in conjunction with bi-metallic sensing elements and, in fact, the flapper itself may be constructed of a bi-metallic element which is adapted to deflect toward and away from the nozzle in accordance with variations in temperature. The principal disadvantage of the flapper nozzle is its limited capacity since the restriction limits the supply of air.

A foremost feature and object of this invention resides in the provision of a relay valve which retains all of the advantages of the flapper nozzle arrangement and at the same time eliminates the limited capacity inherent in the flapper nozzle.

Another feature and object of the invention resides in in the provision of a relay valve which is adapted to be utilized in conjunction with sensing devices generating relatively low force signals.

Another feature and object of this invention resides in the provision of a relay valve which has relatively large supply and exhaust capacity.

Another feature and object of the invention resides in the provision of a relay valve in which the exhaust is utilized to generate a force balance negative feedback.

Another feature and object of the invention resides in the provision of a relay valve which is of a relatively simple but reliable construction.

The invention may be briefly described as comprising a relay valve which includes a first chamber adapted to be connected to a source of supply pressure, a second chamber adapted to receive control pressure for operating a control instrumentality, and a third chamber adapted to be connected to atmosphere. The valve further includes means for varying the flow from the third chamber to atmosphere in proportion to the controlled variable. A first valve means selectively connects the first chamber to the second chamber and a second valve means for selectively connecting the second chamber to the third chamber. The first and second valve means are alternatively opened in response to differences in pressure between the second and third chambers. A bleed means connects one of the first or second chambers with the third chamber.

The invention further utilizes the pressure in the third chamber as a means for generating a negative feedback.

The aforegoing features and objects along with others will be apparent upon reading of the specification along with reference to the following drawings.

In the drawings:
FIGURE 1 is a sectional view of one form of the invention;
FIGURE 2 is a sectional view of a second form of the invention; and
FIGURE 3 is a sectional view of a third form of the invention.

It will be apparent that the subject invention may be used in numerous environments. However, for purposes of convenience the invention will be described as used in conjunction with pneumatic systems for controlling variables such as temperature but it is to be understood that this is merely by way of example and is in no manner to be construed as a limitation.

The various components used in the construction of the invention may be constructed of any suitable material that will permit them to perform in the manner intended. It will be apparent that a great many of the parts may be constructed from metals except for the diaphragms, seals and the like which may be constructed of rubber or suitable substitutes.

Referring now to FIGURE 1 there is shown one form of the invention generally denoted by the numeral 10. The valve 10 comprises an upper casing member 12 and a lower casing member 14. The casing members 12 and 14 are provided with complementary crimped flanges, indicated by the numeral 16, for purposes of mutual attachment.

The lower casing member 14 is provided with a supply port 18 which is adapted to be connected to a suitable source of supply pressure (not shown). The lower casing 14 is further provided with a control pressure port 20 which is connected to a suitable control instrumentality such as a motor valve (not shown). If the valve 10 is to be utilized for the control of temperature which in turn is controlled by the supply of hot water through a heat exchanger then the motor valve could be used to regulate the rate of flow through the heat exchanger. The variations in the control pressure would be used for the opening and closing of the motor valve whereby the rate of flow is varied.

The upper casing member 12 is provided with an exhaust port 22 which cooperates with the valve member 24. The valve member 24 moves with respect to the port 22 by means of a temperature sensing device such as a bi-metallic element 26. In the preferred embodiment the valve member 24 and the bi-metal 26 are mechanically unconnected except for their abutting relationship. The bi-metallic element 26, as a result of the variations in temperature, deflects toward and away from the port 22 in a well known manner. The bi-metallic element 26, in the preferred embodiment, is biased against the valve member 24 so as to force the valve member 24 toward seating engagement with the port 22. However, when the relay valve 10 is at equilibrium the pressure within the chamber 34 forces the valve member 24 out of seating engagement against the force exerted by the bi-metal 26. The gap between the valve member 24 and the port 22 is directly proportional to the force exerted by the pressure within the chamber communicating with port 22. The forces exerted by the pressure and the bi-metal 26 are equal and opposite and constitute a negative feedback in which a change in pressure within the chamber 34 is reflected by a commensurate change in the gap 24 and the port 22 as will be explained more fully later on.

For purposes of convenience, it will be assumed that the bi-metal 26, in sensing an increase in temperature, will exert a greater force on the valve 24 and on sensing a decrease in temperature will exert less force on the valve 24.

In the preferred embodiment, the valve member 24 is a ball or sphere or at least has a spherical portion which is adapted to cooperate with the port 22. The spherical shape facilitates the positioning of the valve 24 with respect to the port. The valve 24 may be provided with the pin 24a which further facilitates the handling and positioning of the valve 24. In the drawings the valve 24 is shown as being seated but it will be understood that when the relay 10 is in operation it will normally be unseated or open.

It will be apparent that other sensing devices may be utilized rather than the bi-metal 26. For example a bellows, or a Bourdon tube may be used for moving the valve member 24 with respect to the port 22.

Within the casing members 12 and 24, as assembled in the manner shown in FIGURE 1, there are three chambers 30, 32 and 34. The chamber 30 is connected to the supply port 18 and is normally under supply pressure. The chamber 30 is defined by the wall 36 which is a part of the lower casing member 14 and a partition 38 which extends between it and the chamber 32. The partition 38 is provided with a port 40 which extends between the chambers 30 and 32.

The chamber 32 is defined by the partition 38 and the diaphragm 42. The diaphragm 42 is of an annular construction in which the outer edges are clamped between the upper and lower casing members 12 and 14. The diaphragm 42 separates the chamber 32 from chamber 34.

The chamber 34 is under pressure which varies from substantially equal to the control pressure to slightly greater than atmospheric. The chamber 34 is connected to atmosphere by means of the port 22, as can be seen from the drawing. The pressure within the chamber 34 is at least partially dependent upon the magnitude of the opening in the valve member 24, as will be discussed in greater detail later on.

Intermediate the chambers 32 and 34 is a valve seat assembly 44 which is mounted on the diaphragm 42. The valve seat assembly comprises the annular seat member 46 having the axially positioned port 48. The annular member 46 includes a cup shaped portion 50 which extends upwardly through an opening 52 and the diaphragm 42. The inner margin of the diaphragm 42 is clamped between the outwardly extending flange 54 and a retaining ring 56.

Intermediate the ports 40 and 48 is a valve assembly 58. The valve assembly comprises the upper valve member 60 which is adapted to cooperate with the port 48 and the lower valve member 62 which cooperates with the port 40. The valve member 60 controls the flow between the chambers 32 and 34 and the valve member 62 controls the flow from the chamber 30 to the chamber 32.

The valve members 60 and 62 are interconnected by means of the stem 64. The valve member 62 is biased toward seating engagement with the port 40 by the coil spring 66. Similarly the valve seat assembly 44 is biased toward engagement with the valve member 60 by means of a coil spring 68. Thus when the valve member or relay 10 is in the normal or equilibrium state, the valve member 60 is in seating engagement with its port 48, and the valve member 62 is unseated from its port 40 a small amount to provide a bleed from the chamber 30 to the chamber 32.

Intermediate the chambers 32 and 34 is a bleed means or restrictor which permits flow from chamber 32 to 34. In its simplest form the bleed means may be a small notch or cut in the valve seat member 44 adjacent port 48 so as to permit flow past valve 60 even when seated. The bleed means 70 will generally be of a predetermined size to permit a predetermined rate of flow from one chamber to the other. The flow across the restrictor 70 serves to replenish the air within the chamber 34 which is constantly being exhausted through the port 22. Furthermore, the flow through the restrictor serves to maintain some level of pressure greater than atmospsheric and which in turn generates a force on the valve member 24 equal and opposite that imposed by the bi-metal 26.

When the valve 10 is in a state of equilibrium, the pressure within the chamber 34 will be less than the control pressure within the chamber 32 by an amount equal to the pre-load on the spring 68. It can now be seen that the diaphragm 42 senses any differences in pressure between the chambers 32 and 34, other than that accounted for by the spring 68. Should there be an imbalance of pressure between the two chambers so as to result in a difference in force imposed upon the two sides of the diaphragm then there will be a corresponding deflection of the same in accordance with the direction of the greater of the two forces. This can be further understood by the following description of the operation of the valve 10.

Supposing that the bi-metal 26 senses an increase in temperature demanding that the flow of liquid to the heat exchanger be decreased, the bi-metal 26 will exert a greater force on the valve 24. As a result, the valve 24 will move toward engagement with the port 22 thus decreasing the flow to atmosphere. In some instances the valve 24 may actually seat on the port 22, thus completely stopping the exhaust. This will mean that the flow through the restrictor 70 is at a greater rate than the flow through the port 22 so that the pressure within the chamber 34 begins to increase. When this happens the diaphragm 42 senses a greater pressure and in turn force on the chamber 34 side and thus is deflected downwardly toward the chamber 32. The downward deflection of the diaphragm 42 in turn causes downward movement of the valve seat assembly 44 and the valve assembly 58 so as to unseat the valve member 62 from the port 40. This unseating permits supply pressure to flow into the control pressure chambers 32 so as to increase the control pressure. As soon as the force generated by the pressure within the chamber 32 equals that force imposed by the pressure within the chamber 34, the diaphragm will be deflected upwardly toward its equilibrium position so that the valve member 62 is again seated. When this happens, the flow of the supply pressure into the chamber 32 is terminated.

As the pressure in the chamber 34 builds up, the force on the valve 24 increases so that eventually the valve is lifted from its seated position and is finally restored to its equilibrium position. As the valve 24 is lifted the exhaust to atmosphere is recommended and increased to the point that it equals the bleed from chamber 32 to chamber 34. When the relay 10 is at equilibrium the rates of exhaust and bleed are equal so that there is no further change in pressure in chamber 34.

Should the bi-metal 26 sense a decrease in temperature it will exert a lesser force on the valve 24, in accordance with the previous assumption. The valve member 24 will be moved away from the port 22 so as to permit a greater rate of exhaust to atmosphere. This will result in a lowering of the pressure within the chamber 34. When this happens, the force exerted on the diaphragm 42 by the pressure within the chamber 34 will be decreased a corresponding amount so as to cause an imbalance of forces sensed by the diaphragm. Accordingly, the diaphragm 42 will be forced upwardly by the greater force exerted by the pressure within the chamber 32. This in turn will move the valve seat assembly 44 upwardly out of engagement with the valve member 60. The valve member 60 is prevented from any further upward movement as a result of the seating relationship between the valve member 62 and the port 40. As a result of the disengagement of the valve 60 and the port 48 the control pressure within the chamber 32 is permitted to exhaust into the chamber 34, thus lowering the pressure within the chamber 32. As soon as the chamber 32 pressure is diminished to the point that the forces sensed by the diaphragm 42 are equal, the latter will be returned to its equilibrium position whereby the valve member 60 is once more in seating engagement with the port 48. At this point the rate of flow into the chamber 34 is reduced to that provided by the bleed means 70.

As the pressure in the chamber 34 decreases, the force exerted by the pressure on the valve 24 decreases, whereby it is forced downwardly by the bi-metal 26. This will continue until the rate of flow into the chamber 34 and the exhaust therefrom are equal, or in other words, until the relay 10 is at equilibrium.

The valve 10 includes a further source negative feedback which returns the various elements to their equilibrium positions upon a commensurate change in the control pressure. Specifically, as the control pressure changes, assuming a change in the position of the ball 24 as a result of a change in temperature, the change in the control pressure is sensed by the diaphragm 42 thus tending to return to its equilibrium position. Another source of negative feedback is a change in pressure in the chamber 34. Such change in pressure will be reflected in a corresponding change in force exerted against the valve 24 in reaction to the force exerted by the bi-metal 26.

Referring now to FIGURE 2, there is shown a second form of the invention in which like parts will be designated by like names and numbers. Briefly, the second form of the invention, which is generally denoted by the numeral 100, includes the upper and lower casing members 12 and 14 which define the chambers 30, 32 and 34. The chamber 30 communicates with a source of supply pressure (not shown) through the supply port 18. The chamber 32 is under control pressure and communicates with a control instrumentality (not shown) through the control port 20. The chamber 34 exhausts to atmosphere through the port 22 and is under a pressure somewhat less than the control pressure but normally greater than atmosphere. The exhaust through the port 22 is controlled by means of a valve 24 which is secured to a temperature sensitive bi-metal 26.

The chambers 30 and 32 are separated by the partition 38 in which is the port 40. The chambers 32 and 34 are separated by means of the diaphragm 42 which is clamped on its outer edges between the upper and lower casing members 12 and 14. Fixed to the diaphragm 42 is the valve seat assembly which includes the valve seat member 46 having the port 48 communicating between the chambers 32 and 34. The valve seat assembly is affixed to the diaphragm by means of the ring 56. The coil spring 68 abuts the valve seat member 46 toward engagement with the valve member 102.

The valve member 102 is one of the principal differences between the second configuration of the invention and the first configuration previously described. The valve member 102 is essentially cylindrical in form and includes the valve member 104 which is adapted to cooperate with the port 48 for controlling the flow therethrough. It further includes the valve member 106 which cooperates with the port 40 for controlling the flow therethrough. As mentioned previously, the valve seat member 46 is normally biased into engagement with the valve member 104 by means of coil spring 66. Similarly, the valve member 106 is normally in engagement with the port 40 as a result of the coil spring 66.

The valve member 102 is provided with an axial bore 108 which includes a restriction 110 at the upper end. The bore 108 connects the supply chamber 30 with the exhaust chamber 34. As a result of the restrictor 110, there is a small but constant bleed from the supply chamber 30 to the exhaust chamber 34. This bleed serves to replenish the air that is exhausted out through the port 22. When the valve is in equilibrium the rate of flow through the restriction 110 is the same as the exhaust through the port 22 so that the pressure within the chamber 34 remains constant.

The operation of the valve 100 is essentially the same as that of the first modification. Accordingly, a repetition of the operation is not necessary.

Referring now to FIGURE 3 there is shown a third form of the invention, generally denoted by the numeral 200. The valve 200 includes an upper casing 202 and a lower casing 204 which are secured together by suitable means (not shown).

The casing members 202 and 204 define a pair of compartments 206 and 208, which in their simplest form, comprise cylindrical bores that are separated by the wall 210 but are connected by the passages 211a and 211b. Both of the compartments or bores 206 and 208 are connected to the exhaust port assembly 212 which includes the exhaust port member 214 which is threadably received in the aperture 216. The exhaust port member 214 includes the bore 218 and a valve seat surface 220. A valve member 222 cooperates with the valve seat 220 and is driven by means of the bi-metal 224.

Within the compartment 206 is mounted a valve seat assembly 226. In the compartment 208 is mounted a valve seat assembly 228. The valve seat assemblies 226 and 228 divide the compartments 206 and 208 into three chambers, 230, 232 and 234. The chamber 230 is under supply pressure which is received in the supply pressure port 202a in the upper casing member 202. The chamber 232 is under control pressure and is connected by means of the control pressure port 202b which is adapted to be connected to a suitable control instrumentality (not shown). The control pressure chamber 232 actually extends into both compartments 206 and 208 but for purposes of convenience will be referred to as a single chamber since it is under the same pressure. The same is also true with respect to the chamber 234 which is connected to atmosphere through the exhaust port 214. The chamber 234 is under control pressure when the valve is at equilibrium.

The valve seat assembly 226 includes valve seat members 240 and 242. The valve member 240 is cylindrical in shape and is maintained received in the compartment 206 and is in sealing engagement by any suitable means such as the O-ring seal 240a with the walls of the compartment defining the same. The valve seat member 240 includes an axial bore 244 which extends between the chambers 230 and 234.

The valve seat member 242 is substantially cylindrical in shape and is received within the compartment 206 in sealing engagement by any suitable means such as the O-ring seal 242a with the walls of the compartment defining the same. The valve seat member 242 separates chambers 230 and 232 and includes the axial bore 246. The axial bore 246 is provided with a valve seating surface 248 which cooperates with the valve assembly 250 and specifically the valve member 252 to control the flow therethrough.

The frictional engagement of the O-ring seals 240a and 242a will tend to prevent the valve seat members 240 and 242 from inadvertently sliding within the compartment 206. Thus once the valve seat members are positioned within the compartment they will remain in that position during the normal operation of the relay.

The valve assembly 250 includes the valve member 252, the restrictor member 254 and a stem 256 for connecting the two valve members. The valve member 252 is normally biased into seating engagement with the valve seat 248 by means of a coil spring 258 which engages the annular flange 259 securing to the valve seat member 242. A coil spring 261 which is confined between the shoulder 242b and the ball valve 252 may be mounted in opposing relationship to spring 258 so as to offset the same and to thus minimize, or even eliminate, any seat reaction between ball valve 252 and the seating surface 248. The restrictor member 254 is received within the bore 244 and is not actually in seating engagement with the valve seat member 240. Specifically, the restrictor member 254 in one form comprises a ball member having a diameter slightly less than the diameter of the bore 244. In this manner there is a clearance between the ball 254 and the bore 244 so that there will be a continued leakage or bleed past the valve member 254. When the relay is at equilibrium the leakage past the ball 254 is substantially equal to the exhaust from the port 214. This leakage past the ball 254 is from the supply chamber 230 to the exhaust chamber 234.

In the preferred embodiment, the diameter of the bore 246 is substantially equal to the diameter of the ball 254. Thus the surface areas of the ball 252 and the valve 254 which are exposed to the supply pressure are substantially equal. Therefore, the forces generated by the supply pressure acting on these surfaces will be equal and opposite so as to offset each other.

A further effect is that the surface area of the ball 254 which is exposed to the pressure within the chamber 234 is substantially equal and opposite to the resultant surface area on the ball 252 subjected to the pressure within the chamber 232. Thus when the pressure within the chambers 232 and 234 are equal the forces exerted by such pressures on the valve assembly 250 are substantially equal and opposite. As will be explained more fully later on, the difference in pressure between chambers 232 and 234 is utilized for driving the ball valve assembly 250.

The valve seat assembly 228 comprises a cylindrical body 260 which is received within the compartment 208 and is in sealing engagement with the walls thereof. The valve seat member 260 includes the radial passages 263 and an axial bore 264 which communicates between the chambers 232 and 234. The flow through the axial bore 264 is regulated by the valve member 266 which comprises a rubber flapper 268, secured to the valve seat member 260 by means of a stem 270 and a threaded lug 272. The lug 272 is received by an appropriately threaded aperture within the valve seat member 260.

The flapper 268 is adapted to normally engage the seating surface 274 provided on the valve seat member 260. The seating surface in this instance comprises an annular ridge surrounding the axial bore 264. As a result of the construction of the valve member 266 when the pressure within the chamber 232 is greater than that in the chamber 234, the flapper member 268 is lifted from seating engagement so that there is flow from the control pressure chamber 232 into chamber 234. If, however, the pressure is greater in the chamber 234 then the flapper 268 is forced into sealing engagement with the ridge 274 so that there is never flow from the chamber 234 into the chamber 232.

The operation of the valve will now be described. Assuming that the bi-metal 224 senses an increase in temperature, it will increase the force on the valve member 222 so as to drive the same toward engagement with the seat 220 of the exhaust port 214. This would of course restrict the exhaust which in conjunction with the leakage past the ball 254 causes a build-up in pressure within the compartment 234. The higher pressure in the compartment 234 exerts a greater force on the valve assembly 250 than the control pressure in the chamber 232. This causes the entire valve assembly 250 to move downward so as to unseat the ball valve 252 from the seating surface 248. When this happens the supply pressure is communicated from the chamber 230 into the chamber 232 so as to raise the pressure within the latter chamber to a level that is equal with that in the chamber 234. As soon as the pressures within the chambers 232 and 234 become equalized, the valve assembly 250 will be driven upwards so as to bring the valve member 252 into seating engagement. This will prevent further flow from the supply chamber 230 into the chamber 232.

Should the bi-metal 224 sense a decrease in temperature, it will decrease the force on the ball valve member 222 whereby the pressure in the chamber 234 will force it further from the outlet port 214. This will permit a greater rate of exhaust which will consequently lead to a lowering of the pressure within the chamber 234. When the pressure within the chamber 234 is less than that in the chamber 232, the flapper valve 268 will become unseated so as to permit flow through the bore 264. This will continue as long as there is a differential in pressure between the two chambers 232 and 234. As soon as the pressures become equalized then the flapper will again be seated or at least the flow through the bore 264 will be stopped.

The feed back action of the bi-metal 224 and valve member are the same as described previously. It is also apparent that the valve assembly 250 has an inherent feedback action similar to that of the diaphragm 42 in the first two embodiments.

Although certain specific forms of the invention have been disclosed herein, it is to be understood that this is merely by way of example and not to be construed as a limitation. It will be apparent to those skilled in the art that certain modifications may be made within the scope of the amended claims without departing from the spirit of the invention.

It is claimed:

1. In a pneumatic relay valve to be used in the control of a variable, the combination comprising: casing means providing a first chamber adapted to be connected to a source of pneumatic supply pressure, a second chamber adapted to receive control pressure for operating a control instrumentality, and a third chamber having a port for exhaust to atmosphere; an exhaust valve member cooperative with said third chamber exhaust port for controlling exhaust of said third chamber to atmosphere; means for sensing the magnitude of the controlled variable and for exerting a first force on said exhaust valve member toward a closed position, the magnitude of said first force being dependent upon the magnitude of the controlled variable, said exhaust valve member being further acted upon by a second force tending to unseat said exhaust valve member, said second force being generated by the pressure within said third chamber, said exhaust valve member normally being unseated to permit exhaust from said third chamber to atmosphere at a rate dependent upon the magnitude of the controlled variable; bleed means connecting one of said first and second chambers with said third chamber; first valve means for selectively connecting said second chamber to said third chamber; second valve means for selectively connecting said first chamber to said second chamber; pressure sensing means responsive to an increase in pneumatic pressure in said third chamber to open said second valve means when the flow from said third chamber to atmosphere decreases and responsive to a decrease in pneumatic pressure in said third chamber to open said first valve means when the flow from said third chamber to atmosphere increases, said first and second valve means and said pressure sensing means cooperating to maintain said first valve means closed when said second valve means is open and to maintain said second valve means closed when said first valve means is open.

2. The combination defined in claim 1 wherein said bleed means connects said first chamber and said third chamber.

3. The combination defined in claim 1 wherein said bleed means connects said second chamber and said third chamber.

4. In a pneumatic relay valve to be used in the control of a variable, the combination comprising: casing means providing a first chamber adapted to be connected to a source of pneumatic supply pressure, a second chamber adapted to receive control pressure for operating a control instrumentality, and a third chamber having a first port for exhaust to atmosphere; a first valve member cooperative with said first port for controlling exhaust of said third chamber to atmosphere; means for sensing the magnitude of the controlled variable and for exerting a first force on said first valve member toward a seated position, the magnitude of said first force being dependent upon the magnitude of the controlled variable, said first valve member being further acted upon by a second force tending to unseat said first valve member, said second force being generated by the pressure within said third chamber, said first valve member being normally unseated to permit exhaust from said third chamber to atmosphere at a rate dependent upon the magnitude of the controlled variable; bleed means connecting one of said first and second chambers with said third chamber; diaphragm means extending between said second and third chambers, said diaphragm means being biased toward said second chamber, said diaphragm means including a second port connecting between said second chamber and said third chamber; a second valve member cooperating with said second port for selectively connecting said second chamber and said third chamber; means defining a third port connecting between said first chamber and said second chamber; a third valve member cooperating with said third port, said third valve member being biased toward a closed position, said diaphragm means cooperating with said second and third valve members to unseat said second valve member upon a decrease in pressure in said third chamber when the flow from said third chamber to atmosphere increases and to unseat said third valve member upon an increase in pressure in said third chamber when the flow from said third chamber to atmosphere decreases, said second and third valve members cooperating such that said second valve member unseats only when said third valve member is seated and said third valve member unseats only when said second valve member is seated.

5. The combination defined in claim 4 wherein the rate of flow through said bleed means and from said third chamber to atmosphere are substantially equal when said relay valve is at equilibrium.

6. The combination defined in claim 5 wherein said bleed means comprises a restricted passageway between said first chamber and said third chamber.

7. The combination defined in claim 6 wherein said second and third valve members are seated when the relay valve is at equilibrium.

8. The combination defined in claim 5 wherein said bleed means comprises a restricted passageway between said second chamber and said third chamber.

9. The combination defined in claim 8 wherein said second valve member is seated and said third valve member is open a small amount when the relay valve is at equilibrium.

10. In a pneumatic relay valve to be used in the control of a variable, the combination comprising: casing means providing a first chamber adapted to be connected to a source of pneumatic supply pressure, a second chamber adapted to receive control pressure for operating a control instrumentality, and a third chamber having a first port for exhaust to atmosphere; a first valve member cooperating with said first port for controlling exhaust of said third chamber to atmosphere; means for sensing the magnitude of the controlled variable and for exerting a first force on said first valve member toward a seated position, the magnitude of said first force being dependent upon the magnitude of the controlled variable, said first valve member being normally unseated to permit exhaust from said third chamber to atmosphere at a rate dependent upon the magnitude of the controlled variable; means for bleeding pneumatic fluid under pressure into said third chamber; a diaphragm extending between said second and third chambers, said diaphragm including a second port connecting between said second chamber and said third chamber; means biasing said diaphragm toward said second chamber; a second valve member disposed in said second chamber and cooperating with said second port for selectively connecting said second chamber and said third chamber; a partition between said first chamber and said second chamber, said partition including a third port connecting between said first and second chambers; a third valve member disposed in said first chamber and cooperating with said third port for selectively connecting first chamber and said second chamber; means biasing said third valve member toward said third port; and means rigidly connecting said second valve member and said third valve member, said diaphragm deflecting toward said third chamber and unseating said second valve member upon a decrease in pressure in said third chamber when the flow from said third chamber to atmosphere increases, said diaphragm deflecting toward said second chamber and unseating said third valve member upon an increase in pressure in said third chamber when the flow from said third chamber to atmosphere decreases, said second valve member unseating only when said third valve member is seated and said third valve member unseating only when said second valve member is seated.

11. The combination defined in claim 10 wherein said means for bleeding pneumatic fluid comprises a restricted passageway between said first chamber and said third chamber.

12. The combination defined in claim 10 wherein said means for bleeding pneumatic fluid comprises a restricted passageway between said second chamber and said third chamber.

References Cited by the Examiner

UNITED STATES PATENTS

| 2,312,251 | 2/1943 | Johnson | 236—80 |
| 2,669,247 | 2/1954 | Olah | 137—84 |
| 2,780,413 | 2/1957 | Jensen | 236—82 X |
| 2,803,258 | 8/1957 | Dyson | 137—85 X |
| 2,914,076 | 11/1959 | Zimmerli | 137—85 X |
| 2,919,713 | 1/1960 | Mollick | 137—85 |

FOREIGN PATENTS

| 212,659 | 12/1960 | Austria. |
| 622,693 | 6/1961 | Canada. |
| 769,976 | 6/1934 | France. |

ALDEN D. STEWART, *Primary Examiner.*